United States Patent [19]

Marryman

[11] 4,299,577
[45] Nov. 10, 1981

[54] LINGUISTICALLY CODED ALPHABET CHARACTERS

[76] Inventor: Milisande L. Marryman, 285 W. Skyline Dr., La Habra, Calif. 90631

[21] Appl. No.: 95,505

[22] Filed: Nov. 16, 1979

[51] Int. Cl.³ ............................................. G09B 17/00
[52] U.S. Cl. .................................................... 434/170
[58] Field of Search .................... 35/35 J, 71; 434/170

[56] References Cited

U.S. PATENT DOCUMENTS 1,732,980  10/1929  Mooney ........................... 35/35 J X
3,715,812  2/1973  Novak ................................. 35/71 X

FOREIGN PATENT DOCUMENTS 494981  6/1919  France .................................... 35/71

Primary Examiner—Anton O. Oechsle
Attorney, Agent, or Firm—Dominick Nardelli

[57] ABSTRACT

Each character or letter of the alphabet is coded with, for example, one or more colors wherein the five vowels have the same color substantially over the entire letter, and the consonants have another color also substantially over the entire character. As a separate color code, the upper portion of each vowel A, I, and U and selected consonants have still another color coded thereon, while the vowel E has two different colors coded on its upper portion and different groups of selected consonants have coded thereon one or the other color, coded on the vowel E. However, each of the respective consonant characters has only one color coded on its upper portion. The arrangement of the color codes indicates to a learner which consonant sound is associated with what vowel sound. As still a further separate color code, since consonant sounds are paired so that each pair includes the voiced and the unvoiced sound of the respective character, and the lower portion of the respective pair of characters has the same color codes. The various codes on the different characters help a learner to associate the various sounds to the particular characters.

9 Claims, 2 Drawing Figures

LINGUISTICALLY CODED ALPHABET CHARACTERS

FIELD OF THE INVENTION

This invention relates to means to facilitate forming the respective sounds that are associated with an alphabet letter or character and, more particularly, to a code which is placed on the alphabet characters to teach sounds and pronunciation of the character.

BACKGROUND OF THE INVENTION

There are many prior art systems which can be used to help a child improve his reading ability only after he has learned to form the various sounds of the alphabet letters. Such systems are taught in U.S. Pat. Nos. 1,732,980; 3,290,800; 3,389,480; 3,715,812; 3,823,492; and 4,115,932. However, there is no system which may help a child organize the various characters in various groups wherein the consonants with the same vowel sounds are grouped together and, in another grouping, the voiced and unvoiced consonant sounds are paired in groups.

OBJECTS OF THE INVENTION

An object of this invention is to provide a means to help an early beginner to learn how to associate the basic sounds of consonants and vowels.

Another object of this invention is to provide the means, in the form of a visual code on the alphabet characters which will help an early beginner to group the consonants with the same ending vowel sounds together.

Another object of this invention is to provide a means in the form of a visual code on the alphabet characters which will help an early beginner group the consonants in pairs wherein the beginning form of the consonant sounds are the same except that one consonant is voiced and the other is unvoiced.

These and other objects and features of advantage will become more apparent after studying the preferred embodiment of my invention, together with the appended drawing.

DETAILED DESCRIPTION OF THE DRAWING

Figure 1:
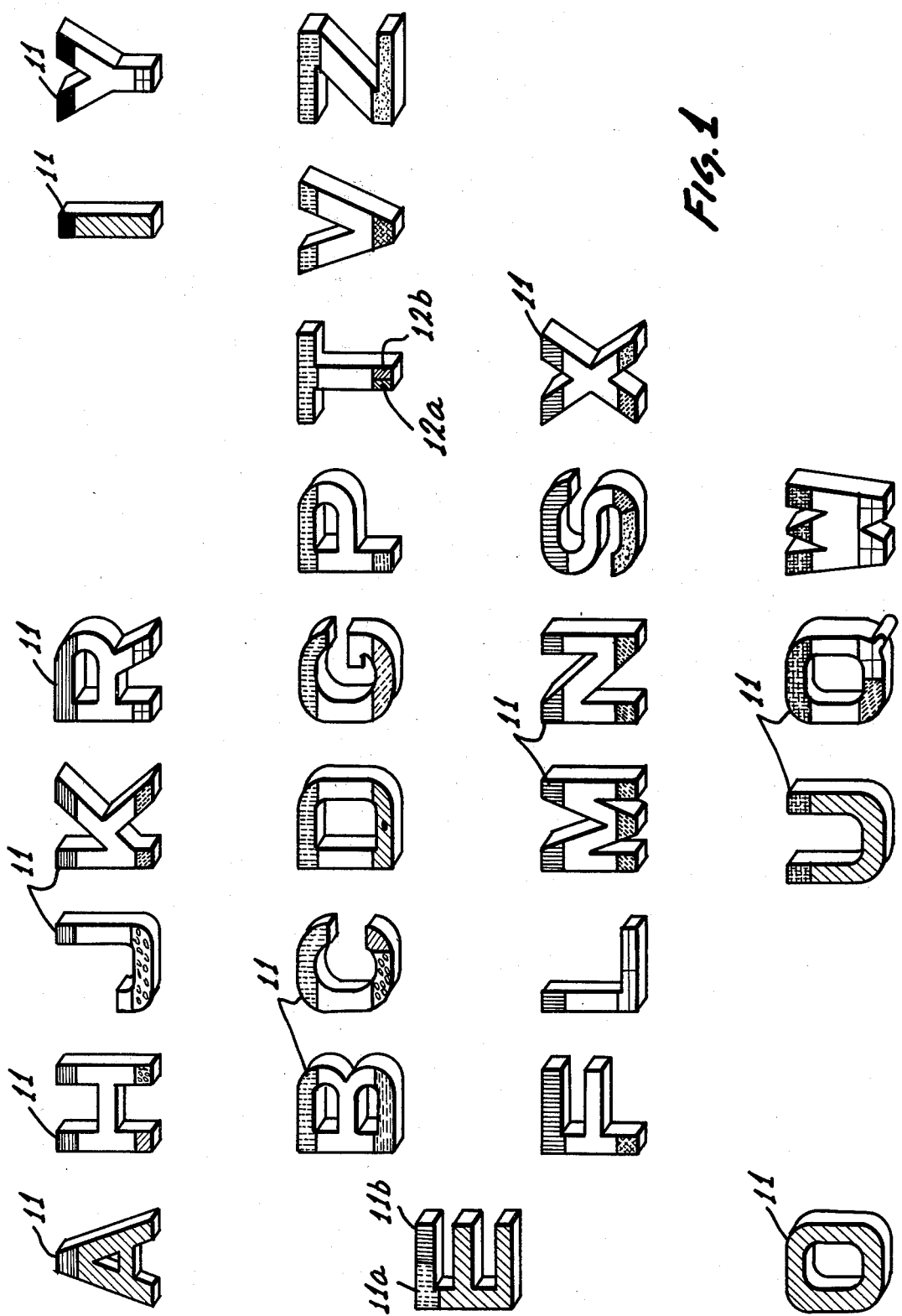
FIG. 1 is an illustration of the 26 characters wherein the respective consonants are shown in a group with a particular vowel. However, because of the various consonant sounds, no consonant is grouped with the vowel letter O.

Referring to the drawing, there are shown in FIG. 1 the 26 characters which form the alphabet of the English language. As one observes, each character except the character O has its upper or top portion 11 painted with at least one particular color. These colors of the top portion designate the organization of the "names" of the characters. A group consisting of the character A and four characters H, J, K, and R have their top or upper portion 11 painted blue, represented in the drawing by closely spaced horizontal lines. Another group consisting of the character I and character Y have their top portions 11 painted black represented by a black area. Still another group consisting of the character U and two characters Q and W have their top portion 11 painted yellow represented by closely spaced dash horizontal lines overlayed by closely spaced dash vertical lines. The character E has its upper or top portion 11 painted in two separate colors wherein the left side or section 11a is painted purple represented by closely spaced vertical dash lines and wherein the right side or section 11b is painted red represented by closely spaced vertical lines. As one will understand hereinafter, when the character E is used in voicing or sounding certain consonants, one makes use of both the long and short E sounds. The group of consonant characters B, C, D, G, P, T, V, and Z also have their upper portion 11 painted purple because, as one voices or pronounces the names of these characters, the long E sound is used. For example, when one reads aloud the letter B, the phonetic spelling would be "BEE." For the short E sound, the group of consonant characters F, L, M, N, S, and X have their upper portion 11 painted red. Since no consonant characters are pronounced with the aid of the vowel O, that character has no special color painted on its upper portion. To aid the novice in pronouncing the characters for the English language, one would preferably paint at least the center portion of all five vowels the same color, for example, brown represented by spaced diagonal lines sloping left, and the center portion of all the consonants the same color, white, represented by a blank spaced portion.

Figure 2:
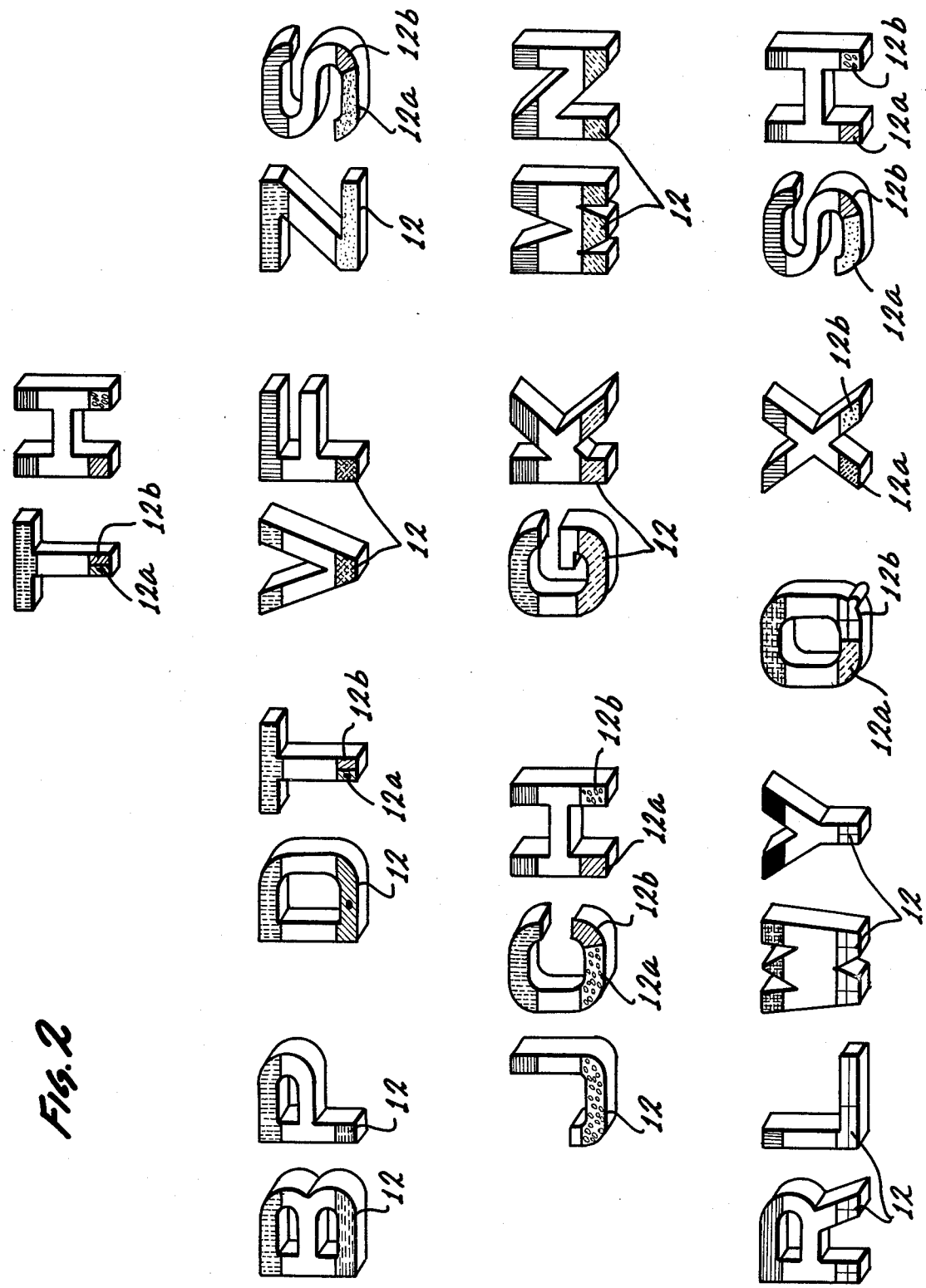
FIG. 2 is another illustration of the alphabet characters wherein the consonant letters are grouped in voiced and unvoiced sound pairs, and a special group of four consonant characters are as shown grouped together.

Referring to FIG. 2 there are shown a plurality of groups consisting of a pair of consonants, for example, BP, DT, VF, ZS, and GK. One observes that when each consonant in a respective pair is pronounced, the first one is what is called the voiced sound, and the second is called the unvoiced sound. A voiced sound, in this patent, means a vibration is set up in one's mouth in order to pronounce the character and by the unvoiced sound, no vibration is produced. One, of course, understands vowel sounds are produced by the vibration of the vocal chords and the consonant sounds are produced in the mouth by use of the tongue and lips. Therefore, so that the novice can detect these respective pairs, each character has its lower portion 12 coded with a color. These are the sounds one uses for reading. Lower portion 12 on characters B and P are painted gray, represented by closely spaced horizontal dash lines. Lower portion 12 of character D and the left section 12a of the lower portion of character T are painted light purple, represented by one dot. For reasons that will be explained hereinafter, characters T, S, and C have their lower portions 12 divided into left section 12a and right section 12b. Lower portion 12 of characters V and F are painted orange, represented by closely spaced crossing sloping dash lines. Lower portion 12 of character Z and the left section 12a of the lower portion of character S are painted pink, represented by closely spaced dots. Lower portions 12 of characters G and K are painted light blue, represented by closely spaced dash diagonal lines sloping to the right.

In FIG. 2 there is also shown a group of letters consisting of three characters J and CH. One observes that the pair produces an unvoiced consonant sound which is the counterpart of the voiced sound of J. Therefore the lower portion 12, the right lower portion 12b and the left lower portion 12a of the respective characters J, H and C are painted light orange, represented by a plurality of small circles. The group consisting of two characters C and H, and also the groups consisting of two characters S and H and of two characters T and H are combined diphthongal type sounds. Although "diphthong" is normally defined as a complex sound made by gliding continuously from the position for one vowel to that for another within the same syllable, the term "diphthongal" herein means a complex sound made from the position for one consonant to that for another within the same syllable. To allow the novice to distinguish these diphthongal type sounds, the right lower portion 12b of each character C, T and S and the left lower portion 12a of character H are painted green, represented by closely spaced diagonal lines sloping to the right. There is shown also characters M and N grouped together, which are nasal or voiced in which one changes the sound by lip and tongue positions. Thus I have painted the lower portion 12 of both characters light brown, represented by closely spaced diagonal dashed lines sloping to the left. Then there are four consonants R, L, W, and Y that have no counterparts representing voiced and unvoiced sounds. Therefore, their lower portions 12 are painted light yellow, represented by one cross consisting of a vertical and a horizontal line. The character X has its lower portion 12 divided into left section 12a and right section 12b, painted light blue and pink, respectively, because of its blended sound using the sounds of characters K and S. Pink is used because, in one sense, the letter X is the unvoiced counterpart of the voiced Z sound. And, in another sense, the light blue is used represented by closely spaced dash lines sloping right to represent its similarity to the K sound. The character Q also has its lower portion 12 divided into left section 12a and right section 12b painted light blue and light yellow, respectively. The light yellow and light blue indicates to the novice that the Q is a blend of the sounds of characters K and W.

Having described the preferred embodiment of my invention, one skilled in the art, after studying the above description, can devise other embodiments without departing from the spirit of my invention. Therefore, my invention is not to be considered as limited to the described embodiment, but includes all embodiments coming within the scope of the appended claims.

I claim:
1. An educational device comprising of:
    a plurality of items, each of which has a character of the alphabet legible thereon;
    each of said characters represents a respective consonant letter and a respective vowel letter;
    each of said letters has an upper portion, a middle portion, and a lower portion;
    each of said consonant letters is painted over the middle portion thereof in a first color to indicate said letter is a consonant;
    each of said vowel letters is painted over at least the middle portion thereof in a second color to indicate said letter is a vowel;
    coding means in the form of different colors painted on said upper portions and said lower portions of some of said letters to aid in the pronunciation thereof.
2. The device of claim 1 wherein said coding means comprises:
    a first one of said vowel letters and at least one of said consonant letters, each having said respective upper portion thereon painted in a third color.
3. The device of claim 2 wherein said coding means further comprises:
    a second one of said vowel letters and at least one of said consonant letters, each having said respective upper portion thereof painted in a fourth color.
4. The device of claim 3 wherein said coding means further comprises:
    a third one of said vowel letters and at least one of said consonant letters each having said respective upper portion thereon painted in a fifth color.
5. The device of claim 4 wherein said coding means further comprises:
    a fourth one of said vowel letters having said upper portion divided into a left section and a right section;
    said left section and said upper portion of at least one of said consonant letters each having a sixth color painted thereon;
    said right section and a said upper portion of at least one of said consonant letters each having a seventh color painted thereon.
6. The device of claim 1 wherein said coding means comprises:
    said consonant letters are formed in twelve groups;
    said first group consists of the letters B and P, each having said lower portion thereon painted in an eighth color;
    said second group consists of the letters V and F, each having said lower portions thereon painted in a ninth color;
    said third group consists of the letters G and K, each having said lower portions thereon painted in a tenth color;
    said fourth group consists of the letters M and N, each having said lower portion thereon painted in an eleventh color;
    said fifth group consisting of the letters R, L, W, and Y, each having said lower portions thereon painted in a twelfth color.
7. The device of claim 6 wherein said coding means further comprises:
    a thirteenth group of letters consisting of C, Q, S, H, T, and X, each having its respective said lower portions divided into a left section and a right section;
    said sixth group of said twelve groups consisting of the letters D and T, wherein said lower portions of said letter D and said left section of said lower portion of said letter T are painted in a thirteenth color;
    said seventh group of said twelve groups consisting of the letters J, C, and H wherein said lower section of said letter J, said left section of the letter C, and said right section of said letter H are painted in a fourteenth color;
    said eighth group of said twelve groups consisting of the letters T and H, wherein said left lower portion of the letter H and said right portion of said letter T are painted in said fifteenth color;
    said ninth group of said twelve groups consisting of the letters S and H, wherein said left lower portion of the letter H and said right lower portion of the letter S are also painted in said fifteenth color;
    said tenth group of said twelve groups consisting of the letters Z and S wherein said lower portion of the letter Z and said left section of said lower section of said letter S are painted in a sixteenth color;

said eleventh group of said twelve groups consisting of the letter Q wherein said left section of said lower portion of said letter Q is painted said tenth color, and said right section thereof is painted said twelfth color;

said twelfth group of said twelve groups consisting of the letter X wherein said left section of said lower portion of said letter X is painted said tenth color and said right section thereof is painted said sixteenth color.

8. The device of claim 5 wherein:

said consonant letters are formed in twelve groups;

said first group consists of the letters B and P, each having said lower portion thereon painted in an eighth color;

said second group consists of the letters V and F, each having said lower portions thereon painted in a ninth color;

said third group consists of the letters G and K, each having said lower portions thereon painted in a tenth color;

said fourth group consists of the letters M and N, each having said lower portion thereon painted in an eleventh color;

said fifth group consisting of the letters R, L, W, and Y, each having said lower portions thereon painted in a twelfth color.

9. The device of claim 8 wherein said coding means further comprises:

a thirteenth group of letters consisting of C, Q, S, H, T, and X, each having its respective said lower portions divided into a left section and a right section;

said sixth group of said twelve groups consisting of the letters D and T, wherein said lower portions of said letter D and said left section of said lower portion of said letter T are painted in a thirteenth color;

said seventh group of said twelve groups consisting of the letters J, C, and H wherein said lower section of said letter J, said left section of the letter C, and said right section of said letter H are painted in a fourteenth color;

said eighth group of said twelve groups consisting of the letters T and H, wherein said left lower portion of the letter H and said right portion of said letter T are painted in said fifteenth color;

said ninth group of said twelve groups consisting of the letters S and H, wherein said left lower portion of the letter H and said right lower portion of the letter S are also painted in said fifteenth color;

said tenth group of said twelve groups consisting of the letters Z and S wherein said lower portion of the letter Z and said left section of said lower section of said letter S are painted in a sixteenth color;

said eleventh group of said twelve groups consisting of the letter Q wherein said left section of said lower portion of said letter Q is painted said tenth color, and said right section thereof is painted said twelfth color;

said twelfth group of said twelve groups consisting of the letter X wherein said left section of said lower portion of said letter X is painted said tenth color and said right section thereof is painted said sixteenth color.

* * * * *